United States Patent
Hood et al.

(10) Patent No.: US 10,274,852 B2
(45) Date of Patent: Apr. 30, 2019

(54) COATING COMPOSITIONS FOR FORMING TONER COATINGS

(71) Applicant: ISP INVESTMENTS INC., Wilmington, DE (US)

(72) Inventors: David K. Hood, Basking Ridge, NJ (US); Charles J. Wasserman, Waukesha, WI (US); Karen B. Visscher, Morris Plains, NJ (US); Sounak Sarkar, Lodi, NJ (US)

(73) Assignee: ISP INVESTMENTS LLC, Wilmington, DE (US)

(*) Notice: Subject to any disclaimer, the term of this patent is extended or adjusted under 35 U.S.C. 154(b) by 0 days.

(21) Appl. No.: 14/777,915

(22) PCT Filed: Mar. 21, 2014

(86) PCT No.: PCT/US2014/031421
§ 371 (c)(1),
(2) Date: Sep. 17, 2015

(87) PCT Pub. No.: WO2014/160604
PCT Pub. Date: Oct. 2, 2014

(65) Prior Publication Data
US 2016/0282737 A1    Sep. 29, 2016

Related U.S. Application Data

(60) Provisional application No. 61/805,307, filed on Mar. 26, 2013.

(51) Int. Cl.
| | |
|---|---|
| *G03G 9/08* | (2006.01) |
| *C08F 226/06* | (2006.01) |
| *G03G 9/087* | (2006.01) |

(52) U.S. Cl.
CPC ....... *G03G 9/08726* (2013.01); *C08F 226/06* (2013.01); *G03G 9/08711* (2013.01); *G03G 9/08724* (2013.01); *G03G 9/08728* (2013.01)

(58) Field of Classification Search
CPC ........... G03G 9/08726; G03G 9/08728; G03G 9/08711; G03G 9/08724; C08F 226/06

USPC .......................................................... 524/548
See application file for complete search history.

(56) References Cited

U.S. PATENT DOCUMENTS

| | | | | |
|---|---|---|---|---|
| 3,650,752 A | * | 3/1972 | Amano | G03C 1/8155 430/139 |
| 5,015,708 A | * | 5/1991 | Shih | C08F 226/06 526/264 |
| 5,910,353 A | * | 6/1999 | Machlica | B32B 27/10 428/195.1 |
| 2005/0271964 A1 | * | 12/2005 | Etou | G03G 9/0806 430/110.2 |
| 2010/0190947 A1 | * | 7/2010 | Hood | C08F 226/02 526/264 |
| 2011/0100824 A1 | * | 5/2011 | Baumgart | C09D 5/4438 205/50 |
| 2011/0200817 A1 | * | 8/2011 | Duckworth | C09D 133/02 428/336 |

FOREIGN PATENT DOCUMENTS

| | | | | |
|---|---|---|---|---|
| WO | WO 9014946 A1 | * | 12/1990 | ............... C09D 5/00 |
| WO | WO-2011063171 A1 | * | 5/2011 | ............... C08F 8/00 |
| WO | WO2011063171 A1 | | 5/2011 | |

OTHER PUBLICATIONS

International Search Report, PCT/US2014/031421 published on Oct. 2, 2014.

* cited by examiner

*Primary Examiner* — Michael Bernshteyn
(74) *Attorney, Agent, or Firm* — William J. Davis

(57) ABSTRACT

The present invention provides coating compositions for forming a toner coating on a substrate containing a polymer comprising: (a) a N-vinyl amide monomer, (b) a vinyl acetate monomer, and (c) a solvent. The coating compositions may further comprise an additional hydrophobic monomer moiety. The present invention further provides coating compositions for forming a toner coating on a substrate containing a polymer comprising: (a) a N-vinyl amide monomer, (b) a styrene monomer, and (c) a solvent. The present invention further provides toner substrates coated with the coating compositions.

24 Claims, No Drawings

COATING COMPOSITIONS FOR FORMING TONER COATINGS

FIELD OF THE INVENTION

This invention provides coating compositions for forming toner coatings on a substrate. This invention also provides substrates coated with the toner coatings.

BACKGROUND OF THE INVENTION

Coating compositions for forming toner coatings is a successful method for forming images on different substrates such as paper, polyester, vinyl, and canvas. However, printing onto substrates such as plastics, such as vinyl, polyester, and polyolefin has not attained the print quality, integrity, and adhesion commonly observed for paper substrates.

United States Patent Application Publications US 2007/0092666 and US 2007/0092668 disclose coating compositions for forming ink jet-receptive coatings on a substrate. U.S. Pat. No. 8,198,353 B2 and U.S. Pat. No. 5,789,123 disclose coating compositions for forming liquid toner coatings on a substrate. International Publication Number WO 2005/115763 A1 discloses coating compositions for forming liquid toner coatings on a substrate.

Accordingly, there is a need for improved toner coatings, which exhibit improved properties including the ability to absorb and retain the ink effectively in both solvent-based and water-based ink printable forms. There is also a need to provide substrates which are coated with coating compositions that are both solvent-based and water-based ink printable.

SUMMARY OF THE INVENTION

The present invention provides coating compositions for forming a toner coating on a substrate containing a polymer comprising: (a) a N-vinyl amide monomer, (b) a vinyl acetate monomer, and (c) a solvent. The coating compositions may further comprise an additional hydrophobic monomer moiety.

The present invention further provides coating compositions for forming a toner coating on a substrate containing a polymer comprising: (a) a N-vinyl amide monomer, (b) a styrene monomer, and (c) a solvent.

The present invention further provides toner substrates coated with the coating compositions.

DETAILED DESCRIPTION OF THE INVENTION

In a first embodiment, the present invention provides coating compositions for forming a toner coating on a substrate containing a polymer comprising: (a) a N-vinyl amide monomer, (b) a vinyl acetate monomer, and (c) a solvent.

Preferably, (a) the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide. More preferably, (a) the N-vinyl amide monomer is selected from the group consisting of N-vinyl pyrrolidone, N-vinyl valerolactam, and N-vinyl caprolactam.

Additional examples of suitable lactamic monomers are disclosed in "A novel route to substituted poly(vinyl pyrrolidone)s via simple functionalization of 1-vinyl-2-pyrrolidone in the 3-position by ring-opening reactions" by H. Reinecke et. al. (*Eur. Poly. J.*, 46 (2010) p 1557-1562) and "Synthesis and polymerization of new pyrrolidone-containing methacrylate monomers" by T. P. Davis et. al. (*Polymer*, 39, 17, p 4165-4169, 1998). Background on the chemistry, structure, and properties of lactamic polymers can be found in "N-Vinyl Amide Polymers" by E. S. Barabas (*Encyclopedia of Polymer Science and Engineering*, 17, $2^{nd}$ ed., p 198-257, (1989)) and in "Polymers of N-Vinylpyrrolidone: Synthesis, Characterization and Uses" by F. Haaf, A. Sanner, and F. Straub (*Polymer Journal*, 17, 1, p 143-152 (1985)).

Suitable solvents in the coating compositions comprise aqueous and non-aqueous solvents. Illustrative non-limiting examples of solvents include water, ethanol, isopropanol, butanol, acetone, methyl ethyl ketone, ethyl acetate, and mixtures thereof.

Preferably, (a) is 0.1-80%, (b) is 1-80%, and (c) is to 100%, by weight. More preferably, (a) is 1-70%, (b) is 1-60%, and (c) is to 100%, by weight. Most preferably, (a) is 1-60%, (b) is 1-50%, and (c) is to 100%, by weight.

Preferably, the polymer is N-vinyl pyrrolidone-co-vinyl acetate. Examples of poly(N-vinyl pyrrolidone-co-vinyl acetate) include PVP/VA E-335, I-335, E-535, I-535, E-735, and I-735, available from Ashland Specialties Ingredients. Examples of poly(N-vinyl pyrrolidone-co-vinyl acetate) also include Luvitec VA 64, VA 64W and the hydrophobically modified Collacral® VAL, available from BASF. Collacral® VAL is an aqueous solution of a vinylpyrrolidone copolymer used to thicken and stabilize polymer dispersions and other aqueous systems. Collacral® VAL is employed as a thickener for polymer dispersions and other aqueous systems and can be used as a protective colloid when resin solutions are mixed with polymer dispersions. Collacral® VAL has a maximum thickening effect in polymer dispersions at a pH of approximately 5. Collacral® VAL can also be employed as a protective colloid in the production of resin dispersions and when resin solutions are mixed with polymer dispersions. More preferably the polymer is N-vinyl pyrrolidone-co-vinyl acetate include PVP/VA E-535, I-535, W-635, S-630, and E-635, available from Ashland Specialties Ingredients.

In another aspect, the polymer further comprises an additional hydrophobic monomer moiety. Examples of hydrophobic monomers include N-vinyl caprolactam, vinyl acetate, vinyl propionate, vinyl cycloaliphatic monomers, vinyl esters (i.e. Veova, available from Momentive™), acrylated glycols, methacrylamides, $C_1$-$C_{20}$ alkyl and $C_1$-$C_{20}$ dialkylacrylamide groups, $C_1$-$C_{20}$ alkyl and $C_1$-$C_{20}$ dialkylmethacrylamide groups, $C_1$-$C_{20}$ alkyl acrylate groups, and $C_1$-$C_{20}$ alkyl methacrylate groups. Preferably, the hydrophobic moiety comprises a $C_1$-$C_{20}$ alkyl acrylate monomer. More preferably, the acrylate monomer is selected from the group consisting of butyl acrylate, stearyl acrylate, octyl acrylate, decyl acrylate, and lauryl(meth)acrylate. Most preferably, the acrylate monomer is stearyl acrylate. In this aspect, the preferred polymer is N-vinyl caprolactam/vinyl acetate/stearyl acrylate.

Preferably, the polymer has a solids content of about 15-50% and a viscosity of about 200-15,000 cps. The composition may also be in the form of an aqueous dispersion. The coating composition has a solids content of about 15-50% and a viscosity of about 200-3,000 cps.

The toner coatings may be in the form of a liquid, solid, or wax. Preferably, the toner coatings are in the form of a liquid In another aspect, the invention provides a toner substrate coated with a coating composition containing a polymer comprising: a polymer comprising: (a) a N-vinyl amide monomer, (b) a vinyl acetate monomer, and (c) a solvent.

In another aspect, the invention provides a flexible food package substrate coated with a coating composition containing a polymer comprising: (a) a N-vinyl amide monomer, (b) a vinyl acetate monomer, and (c) a solvent.

In a second embodiment, the present invention provides coating compositions for forming a toner coating on a substrate containing a polymer comprising: (a) a N-vinyl amide monomer, (b) a styrene monomer, and (c) a solvent.

Preferably, (a) the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide. More preferably, (a) the N-vinyl amide monomer is selected from the group consisting of N-vinyl pyrrolidone, N-vinyl valerolactam, and N-vinyl caprolactam.

The styrene monomer is preferably employed as a vinylpyrrolidone/styrene copolymer, which is derived from vinylpyrollidone and styrene and is commercially available as POLECTRON®430 from ISP, now Ashland Inc. POLECTRON®430 is a low viscosity emulsion that functions as an opacifier because of its shear stability and tolerance to a wide range of pH values and salt concentrations. POLECTRON®430 is also available from GAF and vinylpyrrollidone/styrene copolymer is disclosed in U.S. Pat. No. 4,810,745.

Suitable solvents in the coating compositions comprise aqueous and non-aqueous solvents. Illustrative non-limiting examples of solvents include water, ethanol, isopropanol, butanol, acetone, methyl ethyl ketone, ethyl acetate, and mixtures thereof.

Preferably, (a) is 0.1-70%, (b) is 1-80%, and (c) is to 100%, by weight. More preferably, (a) is 1-50%, (b) is 1-75%, and (c) is to 100%, by weight. Most preferably, (a) is 1-30%, (b) is 1-70%, and (c) is to 100%, by weight.

Preferably, the polymer is N-vinyl pyrrolidone-co-styrene.

Preferably, the polymer has a solids content of about 15-50% and a viscosity of about 200-3000 cps. The composition may also be in the form of an aqueous dispersion. The coating composition has a solids content of about 15-50% and a viscosity of about 200-3,000 cps.

The toner coatings may be in the form of a liquid, solid, or wax. Preferably, the toner coatings are in the form of a liquid In another aspect, the invention provides a toner substrate coated with a coating composition containing a polymer comprising: (a) a N-vinyl amide monomer, (b) a styrene monomer, and (c) a solvent.

In another aspect, the invention provides a flexible food package substrate coated with a coating composition containing a polymer comprising: (a) a N-vinyl amide monomer, (b) a styrene monomer, and (c) a solvent.

The present invention further provides toner substrates coated with the coating compositions.

Polymeric binders, also referred to as emulsions, latexes, adhesives, glues, dispersions, or resins, are versatile systems in the construction and design of polymers. Examples of suitable binder classes include styrene butadiene rubber (SBR) latex, styrene acrylate, polyvinyl alcohol and copolymers, polyvinyl acetate copolymers, vinyl acetate copolymers, carboxylated SBR latex, polyolefins and copolymer of polyolefins (i.e.; poly(ethylene-co-acrylic acid) and poly (ethylene-co-vinyl acetate)), styrene acrylate copolymers, styrene/butadiene/acrylonitrile, styrene/butadiene/acrylate/acrylonitrile, polyalkylene imines, polyvinyl pyrrolidone and copolymers, polyurethanes, polyamines, polyamides, cationic polyurethanes, polyethylene oxide, poly(2-ethyl-2-oxazoline), polyester resins, gelatins, casein, alginate, cellulose derivatives, hydroxyethyl cellulose, ethyl cellulose, hydroxypropyl cellulose, starches, ethoxylated, oxidized and enzyme converted starches, cationic starches, guar, cationic guar, water soluble gums, acrylic vinyl polymers, soy protein polymers as well as mixtures of water soluble and water-insoluble resins, latexes may be used. Latex binders are most commonly emulsions (polymer particles suspended in a liquid medium).

Preferably, a binder is present in the coating compositions of the invention. A preferred binder is a vinyl acetate-ethylene copolymer, such as Vinnapas® 465 Emulsion, available from Wacker Chemie, AG. Vinnapas® 465 Emulsion is a rapid-setting vinyl acetate-ethylene copolymer, which is a high-solids emulsion. This polymer adheres well to various substrates such as polyester, poly(ethylene terephthalate), tempered aluminum foil and polystyrene. This emulsion combines a high-solids content with a low viscosity, which is a combination that permits the addition of high-filler loadings, resulting in adhesive formulations with solid contents of 80%, or more. Furthermore, this emulsion does not thicken excessively on the addition of plasticizers, which allows for the formulation of very high-solids adhesives. Vinnapas® 465 Emulsion also is shear stable, and can be applied on high-speed packaging machines using roll, extrusion, or spray equipment. The emulsion dries to a slightly tacky, clear, water-resistant film. Another preferred binder is Witcobond W-213 polyurethane dispersion, available from Uniroyal Chemical. Witcobond W-213 polyurethane dispersion is a waterborne, cationic dispersion from aliphatic urethanes. Strong, cohesive films can be produced simply by the evaporation of its water content. Witcobond W-213 polyurethane dispersion is used with cationic additives as a protective coating or surface treatment, where the properties of a light stable, waterborne urethane are suitable, primarily for textiles, nonwovens, fiberglass, paper, wood, urethane foam, or other porous substrates.

Preferably a pigment or pigments (colorant or colorants) are used in the coating compositions of the invention. Suitable pigment materials are described in Hunger's "Industrial Organic Pigments," Itoh's "Dictionary of Pigments," and Leach and Pierce's "Printing Ink Manual." Pigment can be added by mixing components. Pigment or pigments may be added with a plasticizer and/or a filler. The exact choice and amount of pigment will depend upon the final desired coating composition and such information is well known in the art.

The electrophotographic process is disclosed in "Effect of Toner Fixing Temperature on Print Properties in the Electrophotographic Process" by T. Hartus (*TAGA Journal*, 4, 2008, 165-177). The adhesion science of toner is disclosed in "Adhesion of Electrophotographic Toner on Paper" by T. Hartus (*Graphic Arts in Finland* 30, 2001, 3). Information related to the electrophotographic process as well as liquid and dry toner materials can be found in "Handbook of Imaging Materials" by A. S. Diamond and D. S. Weiss (ed.) (Marcel Dekker, 2002). Preferably, the toner receptive coating is suitable for fusing to toner at temperatures between 50° C. and 175° C.

Preferably a surfactant is used in the coating compositions of the invention. Surfactants (wetting agents, are compounds that lower the surface tension of a liquid, the interfacial tension between two liquids, or that between a liquid and a solid. Surfactants may act as detergents, emulsifiers, foaming agents, and dispersants. Surfactants are usually organic compounds that are amphiphilic, meaning they contain both hydrophobic groups and hydrophilic groups. Therefore, a surfactant contains both a water-insoluble (or oil-soluble) component and a water-soluble component. Surfactants will diffuse in water and adsorb at interfaces between air and water or at the interface between oil and water, in the case where water is mixed with oil. The insoluble hydrophobic group may extend out of the bulk water phase, into the air or into the oil phase, while the water-soluble head group remains in the water phase. This alignment of surfactants at the surface modifies the surface properties of water at the water/air or water/oil interface. The exact choice and amount of surfactant will depend upon the final desired coating composition and such information is well known in the art.

Other suitable components for aqueous based coatings of this invention include silicates and silica gels, free radical initiators, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latexes, acrylic latexes, polyalkylene glycols, maleic anhydride-co-methyl vinyl ether polymers, polyalkylene imines, oxetanes, oxazolines, benzoxazines, polydiallyldialkylammonium chloride materials, starch, acrylated epoxides, glycidyl acrylate monomers, polyurethanes, acrylated oligomers of polyurethanes, acrylated glycidyl oligomers, polyfunctional acrylates, polyfunctional aziridines, clays, calcium carbonates, talcs, cellulosics, cycloaliphatic epoxides, vinyl ethers, epoxy based dispersions, anionic surfactants (i.e., sodium lauryl sulfate), non-ionic surfactants, cationic surfactants, silanes or silicone based polymers, and anionic polyacrylates, such as polyacrylic acid. Optional components in the composition for optimization of the coating composition when coated on different substrates include pigments, clays, e.g. organoclays and water-swellable clays, acrylic polymers, acrylic copolymers, alginates, carrageenan, microcrystalline cellulose, gelatin, carboxymethylcellulose sodium, hydroxyethylcellulose, hydroxypropylcellulose, hydroxypropylmethylcellulose, methylcellulose, guar and guar derivatives, locust bean gum, polyethylene oxide, polyvinylpyrrolidones, copolymers of polyvinylpyrrolidones, polyvinylalcohols, charge control agents, optical brighteners, other water soluble polymers, silicas, aluminates, zirconates, calcium carbonates, xanthan gums, polymers or copolymers of water soluble vinyl lactams optionally having in situ-formed particles of crosslinked vinyl lactam polymers or copolymers, crosslinked polyvinyl pyrrolidone, and crosslinkers to achieve advantageous printable surface coatings having light stability (see U.S. Pat. No. 6,872,787 B2). Preferred components and optimal amounts of these components will depend upon the specific support coating and application and can be readily determined by one of ordinary skill in the art.

According to one embodiment of the present invention, a solvent may be added. Suitable solvents are described in the "*Industrial Solvents Handbook, 4th Edition*" edited by E. W. Flick (Noyes Data Corporation, Park Ridge, N.J., 1991), which disclosure is incorporated by reference herein. For additional consideration of solvents, useful information is described in "*Polymer Handbook, 4th Edition*," edited by J. Brandrup et. al. (J. Wiley and Sons, New York, 1999), which disclosure is incorporated by reference herein. A solvent is a substance that dissolves a solute resulting in a solution. In solution, all of the ingredients are uniformly distributed at a molecular level and no residue remains. The mixing is referred to as miscibility, whereas the ability to dissolve one compound into another is known as solubility. However, in addition to mixing, both substances in the solution interact with each other. Solvents can be broadly classified into two categories: polar and non-polar. The polarity, dipole moment, polarizability and hydrogen bonding of a solvent determines what type of compounds it is able to dissolve and with what other solvents or liquid compounds it is miscible. Polar solvents dissolve polar compounds best and non-polar solvents dissolve non-polar compounds best: Strongly polar compounds like sugars (e.g., sucrose) or ionic compounds, like inorganic salts (e.g., table salt) dissolve only in very polar solvents like water, while strongly non-polar compounds like oils or waxes dissolve only in very non-polar organic solvents like hexane. Similarly, water and hexane (or vinegar and vegetable oil) are not miscible with each other.

The coating compositions of the invention can provide a glossy, transparent to matte, opaque finish coating on synthetic films such as polyester, vinyl, polyolefins, and the like, as well as paper and canvas.

Generally, the coating composition has a solids content of about a solids content of about 15-50% and a viscosity of about 200-3000 cps.

The polymer in the coating composition suitably has a K-Value of about 5 to about 100, preferably about 10 to about 70.

Colloidal silica, amorphous colloidal silica particles may be included, e.g. 20-150 nm. Preferred colloidal silicas are Silcron IJ-25 and IJ-50. Silica gels, amorphous colloidal silica particles, may also be included, e.g., 4-7 microns. A preferred silica gel is Silcron G 100.

As used herein, the following terms have the meanings set out below.

The term "acidic conditions" refers to conditions relating to the pH value of an aqueous solution. Pure water is considered to be neutral, with a pH close to 7.0 at 25° C. Solutions with a pH value less than 7 are considered to be acidic solutions.

The term "basic conditions" refers to conditions relating to the pH value. Pure water is considered to be neutral, with a pH close to 7.0 at 25° C. Solutions with a pH value greater than 7 are considered to be basic or alkaline.

The term "branched and unbranched alkyl groups" refers to alkyl groups, which may be straight chained or branched. For example, the alkyl groups have from 1 to about 18 carbon atoms, more particularly, from 1 to about 10 carbon atoms, and yet more particularly from 1 to about 6 carbon atoms. Branched groups include isopropyl, tert-butyl, and the like.

The term "copolymer" refers to chains comprising more than one type of monomer unit.

The term "halogen" refers to chloro, bromo, iodo and fluoro, and in one embodiment is bromo and/or chloro.

The term "heteroatom" refers to atoms such as oxygen, nitrogen, sulfur, and phosphorous. When the heteroatom is a nitrogen atom, the nitrogen atom may be present in the form of a quaternary amine.

The term "mineral acid" refers to an acid derived from one or more inorganic compounds. Mineral acids release hydrogen ions when dissolved in water. Commonly used mineral acids are sulfuric acid, hydrochloric acid, and nitric acid.

The term "monomer" refers to the repeat units comprising a polymer. A monomer is a small molecule that chemically bonds to other monomers to form a polymer.

The term "pH" refers to a measure of the acidity or basicity of an aqueous solution. Pure water is considered to be neutral, with a pH close to 7.0 at 25° C. Solutions with a pH less than 7 are considered to be acidic and solutions with a pH greater than 7 are considered to be basic or alkaline.

The term "polymerization" refers to methods for chemically reacting monomer compounds to form polymer chains. The polymer chain may be alternating, branched, blocked, or random. The type of polymerization method may be selected from a wide variety of methods. Such methods include, but are not limited to, free radical polymerization methods, such as classical radical polymerization and controlled radical polymerization, Nitroxide Mediation Polymerization (NMP), Atom Transfer Radical Polymerization (ATRP), and Reversible Addition Fragmentation Chain-Transfer (RAFT).

The coating compositions can be prepared according to the examples set out below. The examples are presented for purposes of demonstrating, but not limiting, the preparation of the coating compositions of this invention.

EXAMPLES

The following non-limiting examples are provided to illustrate a few of the methods for preparing novel coating compositions for forming toner coatings. The examples are presented for purposes of demonstrating, but not limiting, the preparation of the compounds and compositions of this invention.

Example 1

VCap/VA/Stearyl Acrylate (50/40/10)

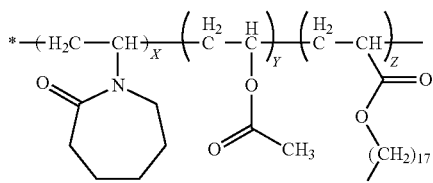

VCap/VA/Stearyl Acrylate

Feed one is prepared with 57.43 g vinyl caprolactam (VCap) (dissolved in 42.37 g MEK); and 26.82 g stearyl acrylate. Put 158.91 g MEK and 28.45 g vinyl acetate (VA) into the reactor and commence purging of the reaction vessel with nitrogen. Heat the reaction flask containing MEK and VA to reflux ~78° C. In a separate vessel prepare a mixture of Triganox 25 C 75 (0.5 g) and MEK (21.18 g). Label this vessel "Triganox Solution". When the reaction flask has reached reflux temperature, begin adding Feed 1, drop-wise, in to the reaction vessel over a period of 180 minutes. After 15 minutes of monomer feed, add 2 g of the Triganox Solution into the reactor. Continue the drop-wise addition of Feed 1 over a period of approximately 165 minutes. While the monomers are feeding into the reactor, after 30 minutes charge 2.17 g of the Triganox solution. After 45, 60, 75, 90, 105 and 120 minutes, charge 2.17 g Triganox solution into the reactor. After 150 minutes, charge 2.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.12 g Triganox 25 C 75. Hold for 2 hours. Add an additional 2.12 g Triganox 25 C 75. Hold for 5 hours then cool reaction mixture.

Example 2

VCap/VA (86/14) Co-Polymer

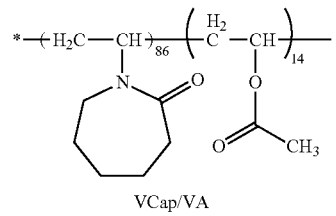

VCap/VA

In a flask equipped with a stir bar, condenser, thermocouple and nitrogen purge place 230.29 g ethanol. Purge the solvent with nitrogen over 20 minutes. Heat the solvent to reflux. The following monomer feeds are prepared: monomer Feed 1 is 10.00 g Vinyl acetate; monomer Feed 2 is 87.00 g Vinyl caprolactam. Feed 1 is added to the reaction, drop-wise over 60 minutes (concurrently with Feed 2). Feed 2 is added to the reaction, drop-wise over 120 minutes (concurrently with Feed 1). In a separate vessel, a mixture of 1.0 g of Trigonox 25 C 75 and 5.0 g of ethanol is prepared and is labeled as "Initiator Solution". After Feeds 1 and 2 have been adding for 10 minutes, add 1.0 g of the Initiator Solution to the reaction vessel. Continue the drop-wise addition of Feeds 1 and 2 to the reaction vessel. After 30 minutes of monomer feed, charge 1.0 g of the initiator solution to the reaction vessel. After 60 minutes of monomer feed, charge 1.0 g of the initiator solution to the reaction vessel. After 90 minutes of monomer feed, charge 1.0 g of the initiator solution to the reaction vessel. At the completion of the monomer feeds, charge the remaining initiator solution to the reaction vessel. Heat the reaction at reflux for an additional 3 hours. After the 3 hour heating charge the reaction vessel with 0.5 g of Triganox 25 C 75 and hold for 120 minutes. Add an additional charge of 0.5 g Triganox 25 C 75 and hold for 5 hours. Cool and collect reaction product.

Example 3

Ink Adhesion on Primer-Coated Clear Polyester

Testing Procedure

Method 1

Preparation of Ink Film and Ink Strips

HP Electroink Black was transferred entirely to a plastic container. This ink was folded repeatedly with a spatula by mixing the suspended ink particulates to a homogeneous ink paste.

The ink paste mentioned in Step A1 (20.0 g) and HP Imaging oil (10.0 g) were added to a 60 ml screw-capped glass vial and mixed well by vigorous shaking to obtain a sample of diluted ink suspension.

Non-Corona treated surface of Clear Polyester film (5 mil, 8.5 inch×11 inch) was coated with the sample of diluted ink suspension obtained in Step A2 by drawing down a thin ink film on the Clear polyester surface using Meyer Coating Rod #26. The wet ink film obtained was allowed to sit on a flat surface for 10 min at room temperature.

The ink film on Clear polyester thus obtained in Step A3 was further dried under vacuum at 100° C. for 20 min in a vacuum oven and then cooled to room temperature to obtain Ink-coated Clear Polyester film.

Square sections (1 inch×1 inch) of the Ink-coated Clear polyester film thus obtained in Step 4 and referred to as Ink Strips were cut out and used to perform ink adhesion tests on primed substrates.

Example 4

Method 2

Preparation of Primed Clear Polyester Substrate Films

Primer coating formulations containing single polymer or combination of polymers used as primers were prepared either as clear solutions (30% Solids, in Acetone, MEK, Ethanol, Reagent Alcohol, IPA or water) or as dispersions (30% Solids, in water).

Primer coating formulations thus obtained in Step B1 were applied on non-Corona treated surface of Clear Polyester films (5 mil, 8.5 inch×flinch) and a thin uniform film of Primer coating formulation was drawn on the Clear Polyester using Meyer Coating Rods #6, #3 or #0 to adjust for required dry coat weight (1-2 g/m²).

The primer coated Clear Polyester films thus obtained in Step B2 were either allowed to air-dry for 1 hour at room temperature (for volatile solvents like Acetone, MEK, Ethanol, Reagent Alcohol or IPA) or dried under vacuum at 130° C. for 15 min in a vacuum oven (for water solutions or dispersions) to obtain dry primed substrate films.

Rectangular sections (2 inch×6 inch) of dry primed substrate films thus obtained in Step 3 and are referred to as Substrate Strips were cut out and used to perform ink adhesion tests.

Example 5

Method 3

Ink Adhesion Test on Substrate Strips and Adhesion Performance Grading

The top face of a hot plate (10.5 inch×10.5 inch) was covered with a Teflon sheet (8 inch×8 inch) and the hot plate surface was maintained at a temperature of 120° C. (±4° C.). Sufficient time was allowed for the Teflon sheet to equilibrate with the hot plate surface temperature and temperature on exposed surface of Teflon sheet was measured using an Infrared thermometer.

Ink Strip (Obtained in Step A5) was placed on the heated Teflon sheet with the ink-coated side facing up. Ink coating on the Ink Strip was allowed to equilibrate to the temperature of the hot plate (120° C.±4° C.) for 2 minutes and temperature of top ink layer measured using an Infrared thermometer.

Substrate Strip (obtained in Step B4) was placed on the heated Ink Strip with the primed side facing down and in contact with the heated ink coating on the Ink Strip.

The Substrate Strip was pressed against the Ink Strip on the hot plate using a Teflon coated rolling pin while applying maximum possible manual pressure (32 rolls, 1 roll=1 forward roll+1 backward roll) to obtain a Substrate Strip-Ink Strip assembly.

The Substrate Strip-Ink Strip assembly thus obtained in Step C4 was lifted from the Teflon sheet on the hot plate and placed on a cold flat surface with the primed surface of the Substrate Strip facing up and allowed to equilibrate room temperature for 2 min.

After 2 min, the clear polyester backing of the ink strip was manually separated from the Substrate Strip-Ink Strip assembly to leave a thin (~0.2 mil) layer of ink on the primed surface of Substrate Strip, henceforth referred to as Ink Patch.

A hatch-pattern consisting of 40 small rectangles was scored on ink patch thus obtained in StepC6 using a razor blade.

Office tape (Scotch® Transparent Tape) was applied on the hatch-pattern on the ink patch on the primed substrate and firm pressure was applied on the tape to ensure maximum adhesion of office tape with ink surface. The office tape was allowed to stay on the ink patch for 10 min and then sharply lifted off to check ink removal from the ink patch.

The results from Test Method 1 in this Ink Adhesion Performance Grading experiment are as follows:

ink removal=0%, Grade=10;

ink removal=100%, Grade=0.

Example 6

Using Test Method 3

| INGREDIENT | INGREDIENT TYPE | PHYSICAL STATE | % of Ingredient in Coating | Grade with Office Tape |
|---|---|---|---|---|
| PVP/VA S-630 | Inventive Adhesive | Film | 100 | 10 |
| Polectron ® 430 | Inventive Adhesive | Film | 100 | 10 |
| Collacral ® VAL | Inventive Adhesive | Film | 100 | 10 |
| Witcobond W-213 | Polyurethane | Film | 100 | 8 |
| Vinnapas ® 465 | Latex | Film | 100 | 0 |
| VAGD | partially-hydrolyzed vinyl chloride/vinyl acetate resin | Film | 100 | 1 |
| Ethyl Cellulose | Hydrophobic cellulosic | Film | 100 | 0 |

Example 7

Test Method 1

100% Ink Adhesion with Office Tape

| INGREDIENT | INGREDIENT TYPE | PHYSICAL STATE | MASS (g) | % SOLIDS | % COMPOSITION |
|---|---|---|---|---|---|
| PVP/VA S-630 | Inventive Adhesive | Solution in water | 5.00 | 30.00 | 25.000 |
| Witcobond W-213 | Polyurethane | Dispersion in water | 15.00 | 30.00 | 75.000 |
| Total | | | 20.00 | | 100.000 |

Example 8

Test Method 1

100% Ink Adhesion with Office Tape

| INGREDIENT | INGREDIENT TYPE | PHYSICAL STATE | MASS (g) | % SOLIDS | % COMPOSITION |
|---|---|---|---|---|---|
| Polectron ® 430 | VP-Styrene Copolymer | Dispersion in water | 5.00 | 30.00 | 25.000 |
| Witcobond W-213 | Polyurethane | Dispersion in water | 15.00 | 30.00 | 75.000 |
| Total | | | 20.00 | | 100.000 |

Example 9

Test Method 1

100% Ink Adhesion with Office Tape

| INGREDIENT | INGREDIENT TYPE | PHYSICAL STATE | MASS (g) | % SOLIDS | % COMPOSITION |
|---|---|---|---|---|---|
| PVP/VA S-630 | Inventive Adhesive | Solution in water | 10.00 | 30.00 | 50.000 |
| Ethyl Cellulose | Binder | Dispersion in water | 10.00 | 30.00 | 50.000 |
| Total | | | 20.00 | | 100.000 |

Example 10

Test Method 1

100% Ink Adhesion with Office Tape

| INGREDIENT | INGREDIENT TYPE | PHYSICAL STATE | MASS (g) | % SOLIDS | % COMPOSITION |
|---|---|---|---|---|---|
| PVP/VA S-630 | Inventive Adhesive | Solution in water | 15.00 | 30.00 | 75.000 |
| Vinnapas ® 465 | Latex | Dispersion in water | 5.00 | 30.00 | 25.000 |
| Total | | | 20.00 | | 100.000 |

Example 11

Test Method 1

100% Ink Adhesion with Office Tape

| INGREDIENT | INGREDIENT TYPE | PHYSICAL STATE | MASS (g) | % SOLIDS | % COMPOSITION |
|---|---|---|---|---|---|
| PVP/VA S-630 | Inventive Adhesive | Solution in Acetone | 15.00 | 30.00 | 75.000 |
| VAGD | | Solution in Acetone | 5.00 | 30.00 | 25.000 |
| Total | | | 20.00 | | 100.000 |

Example 12

Test Method 2

Liquid Toner Adhesive Coating

| INGREDIENT | INGREDIENT TYPE | PHYSICAL STATE | MASS (g) | % SOLIDS | % COMPOSITION |
|---|---|---|---|---|---|
| PVP/VA S-630 | Inventive Adhesive | Dispersion in water | 5.00 | 30.00 | 25.000 |
| Witcobond W-213 | Polyurethane | Dispersion in water | 15.00 | 30.00 | 75.000 |
| Total | | | 20.00 | | 100.000 |

While a number of embodiments of this invention have been represented, it was apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:

1. A toner coating composition on a substrate containing a polymer comprising: (a) a N-vinyl amide monomer, (b) a vinyl acetate monomer, and (c) a solvent; wherein the toner coating composition is suitable for fusing to a toner at temperatures between 50° C. and 175° C.; with the proviso that the toner coating composition is not a print receptive coating or an inkjet coating.

2. The coating composition according to claim 1, wherein the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide.

3. The coating composition according to claim 1, wherein (a) is 0.1-80%, (b) is 1-80%, and (c) is to 100%, by weight.

4. The coating composition according to claim 1, wherein the polymer is N-vinyl pyrrolidone-co-vinyl acetate or n-vinyl caprolactam-co-vinyl acetate.

5. The coating composition according to claim 4, wherein the polymer is N-vinyl pyrrolidone-co-vinyl acetate.

6. The coating composition according to claim 1, further comprising (d) a binder, (e) a pigment, and (f) a surfactant.

7. The coating composition according to claim 1, further comprising an additional hydrophobic monomer moiety.

8. The coating composition according to claim 7, wherein the additional hydrophobic moiety comprises a $C_1$-$C_{20}$ alkyl acrylate monomer.

9. The coating composition according to claim 8, wherein the acrylate monomer is selected from the group consisting of stearyl acrylate, butyl acrylate, octyl acrylate, decyl acrylate, and lauryl (meth)acrylate.

10. The coating composition according to claim 9, wherein the acrylate monomer is stearyl acrylate.

11. The coating composition according to claim 10, wherein the polymer is N-vinyl caprolactam/vinyl acetate/stearyl acrylate.

12. The coating composition according to claim 1, having a solids content of from about 15 to about 50% and a viscosity of about 200-3000 cps.

13. The coating composition according to claim 1, wherein the composition is in the form of an aqueous dispersion.

14. A toner substrate coated with a coating composition containing a polymer comprising: a polymer comprising: (a) a N-vinyl amide monomer, (b) a vinyl acetate monomer, and (c) a solvent; wherein the toner coating composition is suitable for fusing to a toner at temperatures between 50° C. and 175° C.; with the proviso that the toner coating composition is not a print receptive coating or an inkjet coating.

15. A toner coating composition on a substrate containing a polymer comprising: (a) a N-vinyl amide monomer, (b) a styrene monomer, and (c) a solvent; wherein the toner coating composition is suitable for fusing to a toner at temperatures between 50° C. and 175° C.; with the proviso that the toner coating composition is not a print receptive coating or an inkjet coating.

16. The coating composition according to claim 15, wherein the N-vinyl amide monomer is selected from the group consisting of N-vinyl pyrrolidone, N-vinyl valerolactam, N-vinyl caprolactam, hydroxyethylpyrrolidone methacrylate, and N-vinyl formamide.

17. The coating composition according to claim 15, wherein (a) is 0.1-70%, (b) is 1-80%, and (c) is to 100%, by weight.

18. The coating composition according to claim 15, further comprising (d) a binder, (e) a pigment, and (f) a surfactant.

19. The coating composition according to claim 15, wherein the polymer is N-vinyl pyrrolidone-co-styrene.

20. The coating composition according to claim 15, having a solids content of from about 15 to about 50% and a viscosity of about 200-3000 cps.

21. The coating composition according to claim 15, wherein the composition is in the form of an aqueous dispersion.

22. A toner coated substrate coated with a toner coating composition containing a polymer comprising: (a) a N-vinyl amide monomer, (b) a styrene monomer, and (c) a solvent; wherein the toner coating composition is suitable for fusing to a toner at temperatures between 50° C. and 175° C.; with the proviso that the toner coating composition is not a print receptive coating or an inkjet coating.

23. A flexible food package substrate coated with a toner coating composition containing a polymer comprising: (a) a N-vinyl amide monomer, (b) a vinyl acetate monomer, and (c) a solvent; wherein the toner coating composition is suitable for fusing to a toner at temperatures between 50° C. and 175° C.; with the proviso that the toner coating composition is not a print receptive coating or an inkjet coating.

24. A flexible food package substrate coated with a toner coating composition containing a polymer comprising: (a) a N-vinyl amide monomer, (b) a styrene monomer, and (c) a solvent; wherein the toner coating composition is suitable for fusing to a toner at temperatures between 50° C. and 175° C.; with the proviso that the toner coating composition is not a print receptive coating or an inkjet coating.

* * * * *